United States Patent [19]

Poque et al.

[11] Patent Number: 4,768,573
[45] Date of Patent: Sep. 6, 1988

[54] VEHICLE WHEEL

[75] Inventors: Dionysius J. Poque, Aachen; Heinz-Dieter Rach, Garbsen, both of Fed. Rep. of Germany

[73] Assignee: Uniroyal Englebert Reifen GmbH, Aachen, Fed. Rep. of Germany

[21] Appl. No.: 52,187

[22] Filed: May 13, 1987

Related U.S. Application Data

[63] Continuation of Ser. No. 621,523, Jun. 18, 1984, abandoned.

[30] Foreign Application Priority Data

Jun. 18, 1983 [DE] Fed. Rep. of Germany ....... 3321978

[51] Int. Cl.$^4$ .............................................. B60B 71/10
[52] U.S. Cl. ............................. 152/379.3; 152/378 R; 152/381.4
[58] Field of Search ............... 152/158, 516, 520, 521, 152/375, 378 R, 379.4, 379.5, 381.4

[56] References Cited

U.S. PATENT DOCUMENTS

| | | | |
|---|---|---|---|
| 560,660 | 5/1896 | Tomlinson | 152/362 R X |
| 3,930,527 | 1/1976 | French | 152/379.4 X |
| 3,980,119 | 9/1976 | Nakasaki | 152/330 RF X |
| 4,408,647 | 10/1983 | Kuhn et al. | 152/330 RF |

FOREIGN PATENT DOCUMENTS 25742 of 1896 United Kingdom ................ 152/375

Primary Examiner—James B. Marbert
Attorney, Agent, or Firm—Becker & Becker, Inc.

[57] ABSTRACT

A pneumatic tire vehicle wheel which is employable for emergency running or operation. The unitary or one-piece rim with slanted, inclined or cylindrical rim shoulder and rim flange is provided with an emergency running or operating support which is constructed radially elevated in a cap-like configuration. The tire beads are constructed turnable or rotatable around the bead core and are capable of being shifted or displaced in an eccentric manner upon the rim. The round or square bead core lies upon a radial height or level of at least 0.4× the rim flange height in the tire bead. A method for assembling or putting together of a pneumatic tire-vehicle wheel includes the steps of moving the rim and the pneumatic tire with axially outwardly turned or rotated tire beads relatively into each other until a first tire bead is located upon a first rim shoulder; then there is further moving of the rim and pneumatic tire relatively into each other; there is moving of the tire bead over the cap-like rim support until the tire bead is located upon the second rim shoulder; thereafter the further tire bead and the rim are moved relatively into each other until the tire bead is located upon the rim shoulder; then there is shifting or displacing of the tire beads with pumped-in compressed or pressurized air under the rising or building-up interior pressure out of the turned or rotated built-in position upon the rim eccentrically into the clamping position with the rim.

17 Claims, 2 Drawing Sheets

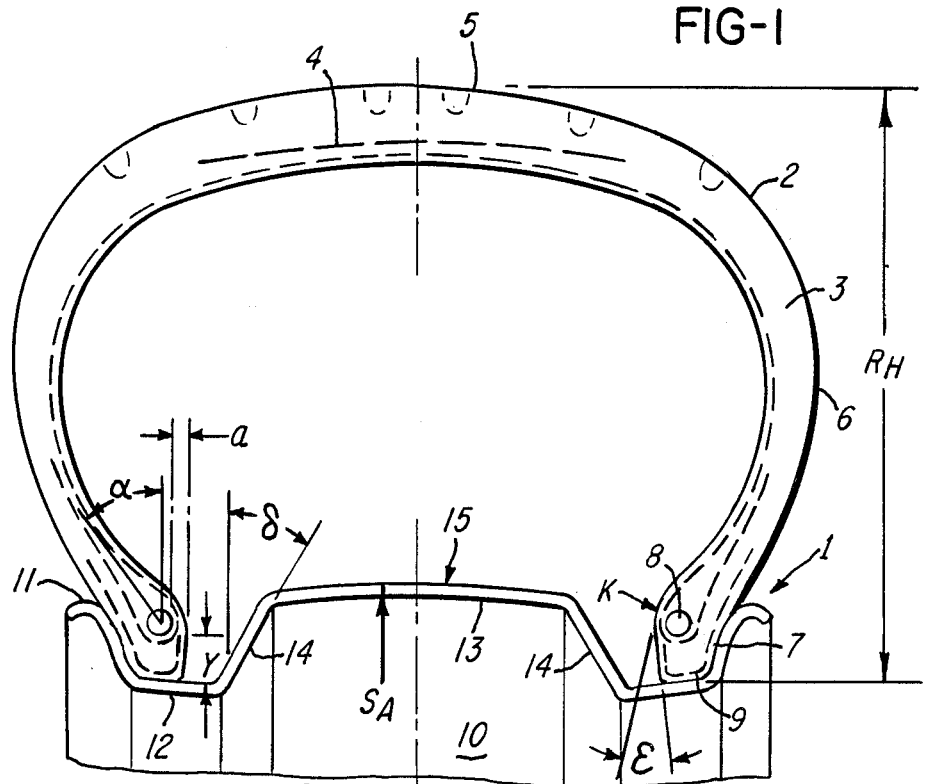
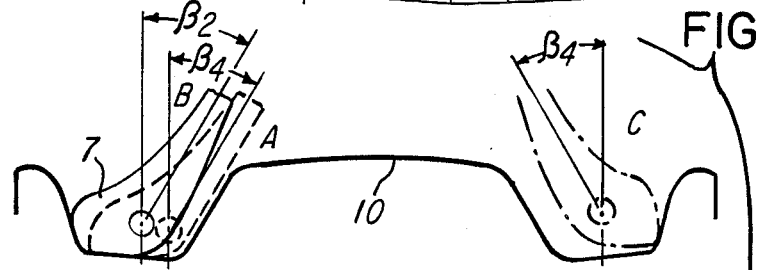
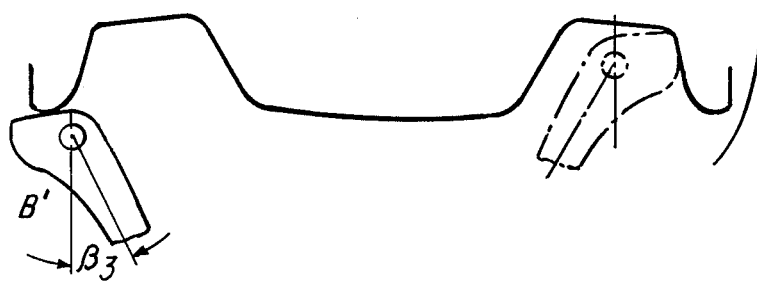

VEHICLE WHEEL

This application is a continuation of application Ser. No. 621,523 filed June 18, 1984, now abandoned.

The present invention relates to a pneumatic tire vehicle wheel which is employable for emergency operation or running. The pneumatic tire vehicle wheel consists of a unitary or one-piece rim and a pneumatic tire which is employable for emergency operation. The rim has a wheel flange, a shoulder of the rim as well as an axially inner safety edge against bead shifting. The pneumatic tire has a carcass and tire beads which include tension-proof bead cores as well as having sidewalls and a tread.

BACKGROUND OF THE INVENTION

1. Field of the Invention

The tire beads with vehicle wheels, especially with tubeless vehicle tires, are held by a wheel flange against lateral slipping or gliding off from the rim shoulder; and also the tire beads are secured against a lateral shifting axially inwardly by a safety edge which is constructed raised or elevated in a bead-like manner. Known vehicle wheels are predominantly constructed with a drop-base or drop-center rim configuration for reasons of good assembly or fitting of pneumatic tire and rim.

Such vehicle wheels can be equipped with different types of auxiliary means which are provided on the pneumatic tire and/or on the rim in order to satisfy the operating condition of a possibly necessary emergency running or operation.

2. Description of the Prior Art

The inflatable hollow body according to German Offenlegungsschrift No. 24 14 588 is an example from a plurality or number of series of such auxiliary means. Such auxiliary means have a considerable disadvantage insofar as these auxiliary means block the mounting-aid-means drop-base or drop-center rim configuration and make the mounting of the pneumatic tire more difficult if not even making such mounting impossible. The by far greatest portion of the emergency running or auxiliary means is complicated in construction and the installation is difficult to master.

Known vehicle wheels with emergency running or operating systems additionally have the problem that such vehicle wheels must assure or guarantee a satisfactory lubrication and a long-term stocking-up or piling-up of reserves of the lubricating means.

SUMMARY OF THE INVENTION

The present invention proceeds on the basis of recognition that a vehicle wheel in essence has to fulfill reliably the normal, daily driving operation objects. The vehicle wheel, however, is to have an auxiliary means for possible emergency running or operation. This auxiliary means is to be not only structurally simple and advantageous from a cost standpoint, but rather the auxiliary means itself even should be advantageously installable and especially should assure and guarantee a problemless tire mounting or assembly. Additionally, the auxiliary means in the event of a situation requiring emergency running or operation also should be capable of reliably fulfilling this additional function. To this extent the present invention relates to improvements on the pneumatic tire and on the rim of the vehicle wheel of the type involved in the present invention.

Technically, an object of the present invention is to produce a vehicle wheel with a unitary or one-piece rim to receive a simply integrated emergency support; this emergency support makes possible the tire mounting without problems; and furthermore, provision is made that the tire beads of the pneumatic tire and constructed movable in order to make possible the mounting of a tire on the rim and in order to form a secure, rigid, stiff clamping connection in final installation condition under prevailing inner air pressure with respect to the rim. Additionally, the tire beads are to be secured against tire-throwing-off from the rim and to assure an emergency running or operation with which the relative movements between the tire low in air pressure or empty of air and the corresponding rim are relatively small or nominal. The premature destruction of the vehicle wheel is to be avoided thereby and via satisfactory supporting of the pneumatic tire during emergency running or operation and also accidents are to be prevented thereby.

BRIEF DESCRIPTION OF THE DRAWINGS

This object and other objects and advantages of the present invention, will appear more clearly from the following specification in connection with the accompanying drawings, in which:

FIG. 1 illustrates a radial partial section through a vehicle wheel having features according to the present invention;

FIG. 2 schematically illustrates a rim with different mounting positions of the tire bead;

DETAILED DESCRIPTION OF PREFERRED EMBODIMENTS

Figure 3:
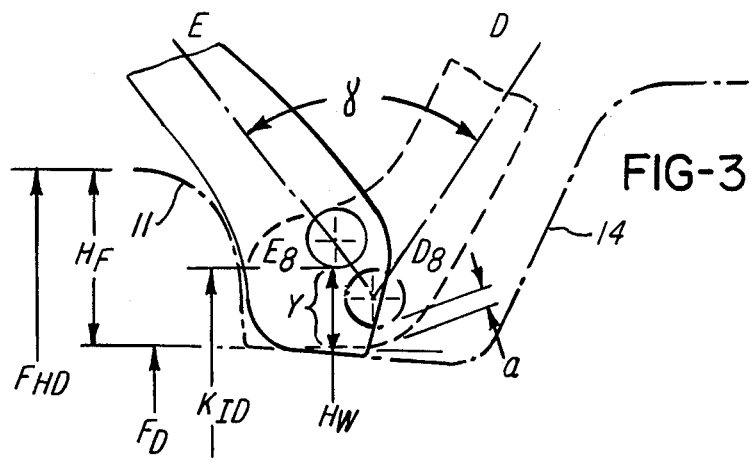
FIG. 3 is a further schematic representation of a part of the rim with the tire bead in different positions.

Referring now to the drawings in detail, the vehicle pneumatic tire 2 of the vehicle wheel 1 according to FIG. 1, which is employable as an emergency running or operating wheel, in essence consists of a tire carcass 3, a tread 5 reinforced by a belt 4, the sidewall 6 and the tire beads 7 thereof. These tire beads 7 each have a bead core 8 to which the carcass 3 is anchored.

Preferably the bead is constructed stiffened by a bead reinforcement 9. The final installation angle $\alpha$ is measured between the neutral thread and the vertical upon the wheel axis, which extends through the bead core. The inner curvature or bending of the bead is designated with k. The bead core 8 occupies a position in the bead which amounts to at least $0.4 \times$ rim flange height $H_F$ measured in a spacing or distance y radially between the core inner diameters $K_{ID}$ and the rim diameter $F_D$. The bead core lies axially in a distance or spacing a (axially) inwardly between the bead core and the curvature k measured at most up to $0.5 \times$ bead-base height $H_W$. The ratio or relationship of bead-base height to axial spacing or distance a is greater than 2.0.

The rim of the vehicle wheel 1 in essence consists of a wheel flange 11, a rim shoulder 12 and a radially raised or elevated support part 13 cap-like in cross section. The sidewalls 14 are constructed inclined toward the equatorial plane. The angle δ can amount to 10° and more. The outer diameter $S_A$ of the arched or arcuately provided support surface 15 is equally large or up to half the tire height $R_H$ larger in comparison to the wheel flange diameter $F_{HD}$.

FIG. 2 shows in detail the installation positions of the tire beads. In the position A at the left side there is noted that the tire bead (dotted position) is shown in a first assembly position and in the illustration of position B there if shown a further position.

The beads are turned or rotated axially outwardly. The further part of the bead in position B' is shown before the bead part is applied or mounted on the rim. In the illustration C at the right side there is noted that the tire bead is already located on the rim. The beads are turned or rotated axially outwardly in this position. The angular phases of installation are shown or indicated by $\beta_2$, $\beta_3$, $\beta_4$.

FIG. 3 illustrates two essential or important positions of the tire bead 7 on the rim. The position D shows the axially outwardly turned or rotated bead during support of the tip-toe or foot tip upon the rim shoulder. $D_8$ represents the position of the bead core. This is the beginning of the eccentric-type dislocation, displacement or shift. As a consequence of the effective forces of the constructive or building-up interior pressure via the pumped-in pressurized or compressed air, the bead moves by an arcuate angle γ as far as into the final position with which the bead surfaces engage pressed against the rim flange and the rim shoulder. The position of the bead core is designated by $E_8$; it is the position E with fixed or stationary clamped connection between the tire bead and rim.

Figures 4, 4A:
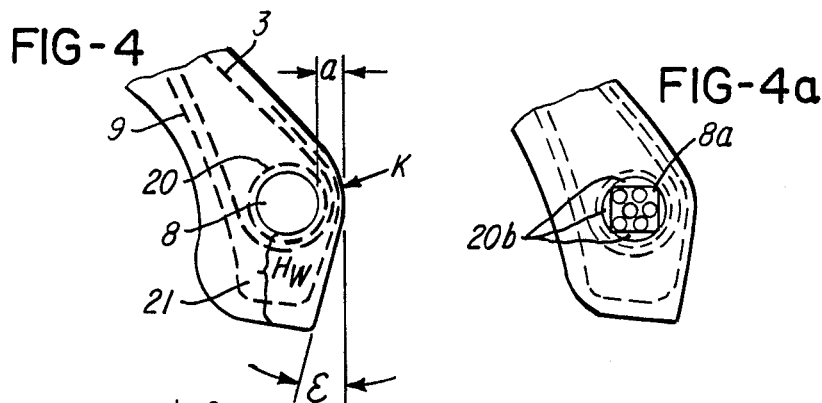
FIG. 4 is a tire bead with a round core.
FIG. 4a is a tire bead with a square core.

FIG. 4 illustrates a bead of which the carcass 3 and bead reinforcement 9 are shown in relation to the round core 8. The fabric winding around the bead core is designated by 20 and the pressed or compressed rubber filling part is designated with 21. The bead inner shape or contour is constructed sloped, inclined, chamfered or tapered axially inwardly between the bend or curvature k and the bead tip at an angle ε of up to 30°. FIG. 4a shows a square core 8a with a filler strip 20b applied or installed at the sides to attain a round shape or form.

Figure 5:
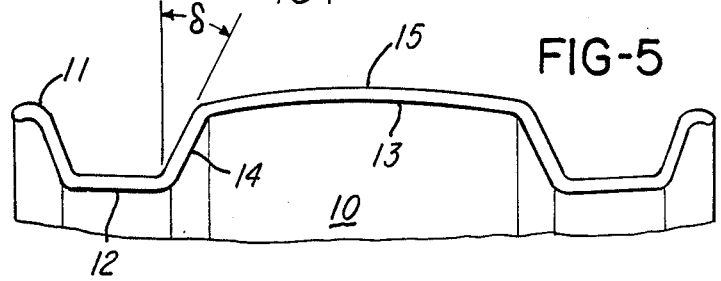
FIG. 5 shows a rim with cylindrical rim shoulders.

FIG. 5 is a radial partial section showing the rim 10 with the rim flange 11 and a cylindrical rim shoulder 12, sidewall 14 of the emergency running or operating support 13 and raised or elevated arch supporting surface 15. The inclination angle δ of the sidewalls can amount to a value in a range between 10° to 60°. The rim shoulder can be constructed also inclined toward the support surface.

Figure 6:
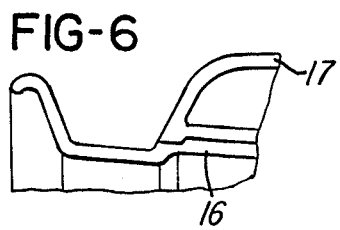
FIG. 6 shows a rim in a divided or separate manner of construction.

FIG. 6 shows a divided manner of construction of the rim with which the rim part with the flange and shoulder at the separating or dividing plane 16 is securely though releasably connected with the cap ring 17. The material for the cap ring 17 can be the same or different with respect to the remaining rim portion.

Figure 7:
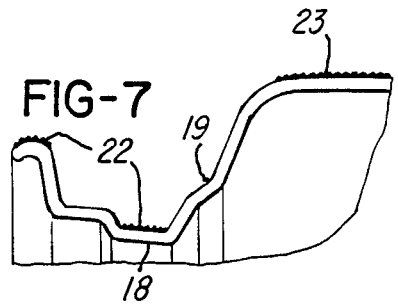
FIG. 7 shows a rim with an emergency running or operating groove.

FIG. 7 shows a rim 10 with an additional radial groove 18. Preferably this groove 18 is constructed having a flat channel, flute or groove. The groove 18 receives the tire bead with low-air or evacuated, empty or air-exhausted (flat tire) condition in emergency running or operation whereby the rim seat and recess are effective like a slide-bar, skid or slide rail before the bead is supported or engaged against the sidewall or retracted, drawn-in wall part represented at 19. The rim flange and rim groove 18 as well as also the support surface can be provided with a friction-reducing layer or coating such as for example Teflon and the like.

The following features are important and meaningful with vehicle wheels which are employable for emergency running and operation;

The pneumatic tire is to have a structural durability like a normal vehicle pneumatic tire; the properties or characteristics of the pneumatic tire are to be given just as with a normal vehicle pneumatic tire; the behavior of the bead with strong side forces as a consequence of pressure air loss is to be improved (rim-roll-off behavior); the travel safety or securing in the case of emergency running or operation is to be guaranteed and assured; the pressure loss should be indicated to the vehicle operator; the travel distance in case of defect should be capable of being traversed or driven as far as to the nearest repair shop or workshop; the wheel set as required, or in case of need as necessary, is to be limited or restricted to four assembled or mounted wheels; the spare tire or reserve wheel is to be expendable or done without for reasons of space and weight saving; the vehicle wheel is to be planned as an original equipment component by vehicle manufacturers or producers; the costs are to be entirely expeditious and advantageous; the problemless handling of tires and rims during mounting and unmounting must be provided; tires and rims are to be producible as simply as possible; the reusability after emergency running or operation should be given; the production of the rim in a unitary or one-piece manner of construction also should be provided or given.

The object of the present invention is fulfilled and met thereby that the tire bead is constructed rotatable or turntable relative to the bead core and is arranged and shiftable in an eccentric manner upon the rim; and the rim receives a radially raised or elevated cap-like support part which is arranged between the rim shoulders.

Turnable or rotatable beads and radially elevated or raised supports respectively themselves are known with pneumatic tires or rims in themselves. The eccentric-type displacement or dislocation or shifting capability of the tire beads according to the present invention is functionally limited or restricted in essence upon the free space between the rim flange, rim shoulder and rim support and also permits problemless tire mounting upon a rim with emergency running or operating support and assures and guarantees a secure and safe clamping connection between the tire bead and rim for daily or everyday travel or driving operation without disadvantages.

The tire beads are in a position because of the rotational-turning and eccentric capability of movement in the range of the rim shoulder. Thus, the tire beads via the forces effective thereon during the building-up of interior pressure automatically encounter changing of the position thereof from the installation or built-in position into a final position differing by a predetermined selectable arcuate angle; in this final position, the tire beads are pressed rigidly and fixed against the rim flange and rim shoulder. In the event of emergency running operation with which the tire low on air or empty or deflated engages with the inner surface with considerable or important parts upon the cap-like emergency support, the rotational capability of the tire beads in the region of the rim shoulder contributes considerably to reducing the disadvantageous relative movements.

The rotatable bead core according to the present invention is located in the bead at a radial bead base height of at least approximately 0.4×rim flange height and axially in a spacing or distance relative to the bead inner curvature of up to 0.5×bead base height. The tire bead is capable of displacement, dislocation or shifting in an arcuate angle of at least 45° with respect to a vertical to the wheel axis which extends through the bead core.

Important is that the tire bead is sufficiently and automatically capable of shifting, displacement or dislocation axially outwardly and inwardly by support of the tip-toe or foot taper upon the rim, so that the pneumatic tire can be mounted problemless at any time upon the drop-base or drop-center free rim. Important furthermore that this tire bead with an outer shape or contour and seating surface, which fit upon standard rims, via a securely or rigidly pressed engagement seat achieves the clamping connection with the rim which is the precondition for a secure force transfer. The pneumatic tire existing at an interior pressure or inflated exerts a pressure upon the tire bead which reliably protects the connection of the tire/rim against interior pressure loss. The bead core during this procedure encounters tractive force, tensile stress or strain.

The rim, aside from the emergency running support, can be constructed like a standard rim, either with B-flange, C-flange, or J-flange. The vehicle pneumatic tire with the tire beads according to the present invention, however, also can be mounted upon rims with cylindrical rim shoulders or also can be mounted on rims having rim shoulders slanted or inclined away from the wheel axis. In the event of an emergency running or operating situation, such a wheel according to the present invention is superior to the conventional wheel with a drop-base or drop-center rim.

The radially raised or elevated support part of the rim is constructed in a cap-like manner, whereby the support surface is constructed cylindrically, preferably however being raised or elevated arcuately or curved. Preferably, the support part is continuously integrated into the unitary or one-piece rim. The sidewalls of the emergency running support adjoin the rim shoulders and are constructed inclined or slanted toward the equatorial plane. Such a structural unit also remains assured when for production technique reasons the cap-like support exists separately and is unified into a rim unit by known fastening means. Hereby the same or a different material can be employed for the cap ring in comparison to the remaining part of the rim.

According to further features of the present invention there is noted that the bead core can consiste of twisted round wires or can consist of wires wound to the normal with square or hexagonal cross section. The cross section can be round or can be supplemented to a round shape and can be surrounded by a fabric strip. This fabric strip preferably does not exist being vulcanized therewith; the fabric strip is arranged free of bonding or adherence. The bead core can be formed also from technical yarns, flexible cables of non-metallic material. The bead reinforcement can be arranged in the region of the bead foot or base drawn down as far as to the rim chafing strip and the intermediate space can be filled out with a rubber filler piece permitting a higher pressing. The tire bead between the bead bend or curvature in the region of the bead core and the tip-toe or foot taper can exits chamfered, inclined or slanted axially outwardly by up to 30°.

The tire bead is securely held upon the rim when high side forces are effective through the closed structural shape of the rim shoulder, which on the one hand is limited by the rim flange and on the other hand is limited by the lateral wall of the emergency running support. A tire throw-off or removal during curve travel under extremely high side forces is practically precluded or prevented. The safety behavior of the vehicle wheel according to the present invention is thereby considerably improved.

The rim additionally can have a radial groove in an axially inner region adjacent to the rim shoulder. The groove serves to take up or receive the tire bead with a pneumatic tire which has become pressureless or low in pressure with the shifted or displaced heel part thereof. The follower or running-along movement is thereby improved.

A further improvement exists with existing friction-reducing layers or plies. The side forces effective during emergency running or operation cannot press the bead from the rim. The tire bead loosened or released from the rim flange moves in the manner of a slide or glide rail as far as to engagement against the sidewall of the emergency running support. An essential and important part of the tire which is empty, deflated or low in air lies or engages upon the emergency running support. Moreover, additionally comparatively small or nominal relative movements exist or are encountered because of the rotational capability of the bead. A necessary lubrication for this reason is not so positively necessary as with known emergency running or operating systems because of the foregoing features with the vehicle wheel according to the present invention.

In summary, the improvements and features according to the present invention can be set forth to include that the tire bead 7 is rotatable relative to the bead core 8 and is arranged shiftable, dislocatable or displaceable in an eccentric manner upon the rim 10, whereby the bead core in the bead is located radially in a spacing or distance y of at least 0.4. Rim flange height $H_F$, measured vertically or at right angles to the wheel axis between the bead core inner diameter and rim diameter and axially in a spacing or distance a of at most 0.5×bead base height $H_W$ exists measured axially internally between the bead core and tangent to the bead inner curvature or bend k; the rim 10 relative to the rim shoulder 12 has a radially raised or elevated support part 13 which is cap-like in cross section; the support part 13 is arranged between the rim shoulders on the two sides and the outer diameter $S_A$ in comparison to the rim flange diameter $S_{HD}$ is at least equally large or is greater up to half the tire height $R_H$.

The tire bead 7, in relation or with respect to the neutral threads in relation to a vertical to the wheel axis which extends through the bead core is shiftable, dislocatable or displaceable in an arcuate angle $\gamma$ of at least 45°.

The bead core 8 is a twisted or stranded wire round core.

The bead core 8a is a wire core polygonal in cross section square to hexagonal in shape, which externally is provided with material strips through which a round shape is formed.

The bead core or round-shape core is surrounded with a fabric.

Also, there is provided a bead core formed of non-metallic thread-, cable- or rope elements.

The bead core is arranged free of bonding or adherence in the bead.

A bead reinforcement 9 is arranged in the bead, which is arranged with the radially inner part thereof removed or remote radially from the bead core.

The space between the bead core and radially inner part of the bead reinforcement is provided with a press-rubber filler part 21. The bead inner shape or contour of the tire bead between the inner curvature k and the tip-toe or foot taper is constructed chamfered or slanted and inclined at an angle ε up to 30°.

The support surface 15 of the raised or elevated support part of the rim 10 is constructed in essence cylindrically and the support part sides 14 are inclined or slanted to the equatorial plane.

The support surface 15 is constructed raised or elevated in a bent or arcuate shape. The sidewalls 14 are constructed slanted or inclined at an angle δ of at least 10°. The rim shoulder 12 has a radial groove or channel or flute 18 in the region axially inside the adjoining sidewall 14.

The rim flange 11 and the rim groove or channel 18 have a friction-reducing layer 22 of Teflon for example.

The support surface 15 of the rim has a friction-reducing layer or coating 23 of Teflon for example.

A method or procedure for assembling a pneumatic tire vehicle wheel according to the foregoing is provided characterized thereby that first the rim 10 and the pneumatic tire 1 are moved relatively into each other with axially outwardly turned tire beads 7 until a first tire bead is located upon a first rim shoulder; and furthermore, that then the rim and pneumatic tire are moved additionally relatively into each other and the tire bead is moved over the cap-like rim support until the tire bead is located upon the second rim shoulder; that thereafter, the further tire bead and the rim are moved relatively into each other until the tire bead is located upon the rim shoulder (positions a-c according to FIG. 2); that then the tire beads, with pumped-in pressurized air or compressed air, shift or are displaced under the building-up or rising interior pressure thereby shifting from the turned or rotated installation or building-in position upon the rim in an eccentric manner into the clamping position with the rim (positions of FIG. 3).

The present invention is, of course, in no way restricted to the specific disclosure of the specification and drawings, but also encompasses any modifications within the scope of the appended claims.

What we claim is:

1. A vehicle wheel including a pneumatic tire having a tread as well as sidewalls each having a tire bead, and a unitary rim having a rim diameter; the unitary rim consisting of on both the sides each having an axial outer rim flange of radial height measured radially outwardly of the rim diameter and each having an axial inner plane rim bead seat of rim diameter and additionally disposed between both the rim bead seats having a radial emergency running support built up by a ringlike supporting area of an outer diameter at a minimum of rim flange diameter plus wall thickness in a bead transition area to the sidewall, however not greater than rim flange diameter plus half the height of the tire section, and both the supporting area with supporting walls, each connected with a rim bead seat;

the pneumatic tire consisting of a carcass with both tire beads each comprising a plane tire seat with a bead toe and reinforced by a tension strength bead ring and further including a bead-connected sidewall and a tread therewith;

the tire bead being rotatable relative to the bead ring and being movable during the tire mounting onto an imaginary fixed linkpoint of the sidewall thereby to move out of a first position into a second position, in which the bead ring is positioned eccentrically on a neutral axis of the sidewall relative to the bead and for the mounted tire relationship thereof concerns the following items for the tire bead:

a radial spacing of a bead ring inner diameter to the rim diameter being less than radial height of the bead between the bead seat and the bead ring and an axial spacing of the bead ring axially inwardly to the radially extending tangent onto the bead outer contour and less than the radial height of the bead between the bead seat and the bead ring inwardly as measured between bead diameter and bead seat having the improvement in combination therewith comprising:

the tire bead during tire mounting being movable out of the first position, in which the bead ring is positioned on the neutral axis of the sidewall/bead axially and radially inwardly into the second position, in which the bead ring is positioned on the neutral axis sidewall/bead axially and radially outwardly with respect to a final position by leverlike shiftable movement onto the plane rim bead seat, and a bead toe is supported on the plane rim bead seat and the bead ring is movable within a free space between the axially outer rim flange, the rim seat and the radial emergency running support.

2. A pneumatic tire vehicle wheel in combination according to claim 1, wherein said tire bead with respect to final position thereof in relation to a vertical at right angles to the wheel axis which extends through the bead core is shiftable and displaceable in an arcuate angle of at least 45°.

3. A pneumatic tire vehicle wheel in combination according to claim 2, wherein said bead core is a twisted wire round core.

4. A pneumatic tire vehicle wheel in combination according to claim 2, wherein said bead core is a polygonal wire core square to hexagonal in cross section which externally has material strips provided thereon through which a round shape is formed.

5. A pneumatic tire vehicle in combination according to claim 4, wherein a fabric surrounds the bead core including the round shaped core therein.

6. A pneumatic tire vehicle wheel in combination according to claim 5, wherein said bead core is made of non-metallic thread-cable-rope-type elements.

7. A pneumatic tire vehicle wheel in combination according to claim 6, wherein the bead core is arranged free of bond and adherence in the bead.

8. A pneumatic tire vehicle wheel in combination according to claim 7, in which a bead reinforcement is arranged in the bead, which reinforcement is arranged with a radially inner part thereof radially removed and remote from the bead core.

9. A pneumatic tire vehicle wheel in combination according to claim 8, wherein a press-rubber filler part is provided in a space between the bead core and the radially inner part of the bead reinforcement.

10. A pneumatic tire vehicle wheel in combination according to claim 9 having a bead inner contour shape of the tire bead inclined at an angle up to 30° between the inner curvature and foot taper thereof.

11. A pneumatic tire vehicle wheel in combination according to claim 1, in which a supporting surface of the raised and elevated supporting part of the rim is constructed in essence cylindrically and the support-part sides are inclined to the equatorial plane.

12. A pneumatic tire vehicle wheel in combination according to claim 11, wherein said support surface is constructed raised and arcuately elevated.

13. A pneumatic tire vehicle wheel in combination according to claim 12, in which the sidewalls are constructed inclined at an angle of at least 10°.

14. A pneumatic tire vehicle wheel in combination according to claim 13, wherein means forming a radial groove in a channel configuration is located in a rim shoulder in a region adjoining the axially inner sidewalls.

15. A pneumatic tire vehicle wheel in combination according to claim 14, having a friction-reducing layer on the rim flange and rim groove.

16. A pneumatic tire vehicle wheel in combination according to claim 15, wherein a friction-reducing layer is coated onto the support surface of the rim.

17. In a method for assembling and putting together a pneumatic tire on a vehicle wheel having a rim, a rim flange as well as an axially inner safety edge against bead shifting including a first rim shoulder as well as a second rim shoulder and a cap-like rim support for a vehicle tire installed progressively thereon in a 90° rotational movement from a turned building-in position upon the rim into a clamping position thereof on the rim, including the steps of:

first transversely moving the rim and the pneumatic tire together with tire beads axially aligned relative to each other until a first tire bead is located upon the first rim shoulder;

then further moving the rim and pneumatic tire relatively into each other;

moving the tire bead in an eccentrical-like movement over the cap-like rim support until the tire bead is located upon the second rim shoulder;

thereafter moving the further tire bead and the rim relatively into each other until the tire bead is shiftably located upon the respective rim shoulder; and the improvement in combination therewith comprising steps of:

then shifting and eccentrically displacing the tire beads upon the rim against the inner safety edge to prevent bead shifting with pumped-in inflating pressurized compressed air subject to a rising built-up interior pressure to shift the tire beads in the eccentrical-like movement out of the turned building-in position upon the rim eccentrically into the clamping position with the rim flange to form a secure, rigid, stiff clamping connection in final installation condition with respect to the rim flange so that the tire beads are secured against tire-throwing-off from the rim flange and to assure emergency running operation with which relative movements between a tire low in air pressure and the corresponding rim are relatively small and nominal.

* * * * *